United States Patent
Tomat et al.

[11] Patent Number: 6,098,513
[45] Date of Patent: *Aug. 8, 2000

[54] ASSEMBLY TO SHEAR ROLLED SECTIONS

[75] Inventors: Ferruccio Tomat, Udine; Giorgio Lavaroni, Buttrio; Giampietro Zamo', Udine, all of Italy

[73] Assignee: Danieli & C. Officine Meccaniche SpA, Buttrio, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/736,676

[22] Filed: Oct. 25, 1996

[30] Foreign Application Priority Data

Nov. 9, 1995 [IT] Italy .................. UD95A0224

[51] Int. Cl.[7] ............ B26D 7/06; B23D 35/00
[52] U.S. Cl. ............ 83/106; 83/425.2; 83/303; 83/343; 83/673
[58] Field of Search ............ 83/302, 303, 300, 83/343, 105, 106, 107, 673, 478, 860, 425.2, 345

[56] References Cited

U.S. PATENT DOCUMENTS

| | | | |
|---|---|---|---|
| 2,247,697 | 7/1941 | Papendick | 83/105 |
| 2,414,772 | 1/1947 | Sheperdson | 83/106 |
| 2,500,772 | 3/1950 | Reed | 83/105 |
| 2,836,018 | 5/1958 | Key | 83/303 |
| 3,799,020 | 3/1974 | Hoelmer . | |
| 3,834,260 | 9/1974 | Sieurin et al. | 83/106 |
| 4,083,277 | 4/1978 | Lotz | 83/107 |
| 4,195,539 | 4/1980 | Coburn | 83/106 |
| 4,241,629 | 12/1980 | McDowell | 83/302 |
| 4,242,934 | 1/1981 | Coburn | 83/425.2 |
| 4,429,603 | 2/1984 | Chapman, Jr. et al. | 83/303 |
| 4,494,427 | 1/1985 | Pechau et al. | 83/306 |
| 4,964,324 | 10/1990 | Pavlick | 83/302 |
| 4,966,060 | 10/1990 | Poloni | 83/105 |
| 5,235,883 | 8/1993 | Jeske et al. | 83/106 |
| 5,644,941 | 7/1997 | Stodt et al. | 83/345 |

FOREIGN PATENT DOCUMENTS

| | | |
|---|---|---|
| 0152122 | 8/1985 | European Pat. Off. . |
| 1241255 | 12/1959 | France .................. 83/302 |
| 1427225 | 4/1969 | Germany . |
| 1530004 | 10/1978 | United Kingdom . |

*Primary Examiner*—Kenneth E. Peterson
*Assistant Examiner*—Sean Pyor
*Attorney, Agent, or Firm*—Stevens, Davis, Miller & Mosher, L.L.P.

[57] ABSTRACT

Assembly to shear rolled sections (11a, 11b) coming from two parallel, adjacent rolling lines, the assembly comprising for each rolling line a feeding unit (13a, 13b), shears (12a, 12b) for shearing to size and a single scrap shears (14) with two pairs of blade-holder elements (15a, 15b) cooperating with the corresponding scrap-conveying channels (23a, 23b), there also being present first switches (20a, 20b) to feed the rolled sections (11a, 11b) alternately towards the the shearing channel (22a, 22b) and towards the scrap-conveying channel (23a, 23b), all the motors being on the same side, the shearing assembly also comprising a cyclone to discharge discards (17) downstream from the scrap shears (14) and comprising, downstream from the scrap shears (14), second switches (21a, 21b) cooperating with the rolled sections respectively (11a, 11b) to feed alternately a double removal channel (24a, 24b) placed downstream.

18 Claims, 4 Drawing Sheets

ASSEMBLY TO SHEAR ROLLED SECTIONS

BACKGROUND OF THE INVENTION

1. Field of the Invention

This invention concerns an assembly to shear rolled sections.

The shearing assembly according to the invention is applied to the field of iron and steel production downstream of rolling plants comprising two parallel rolling lines, the rolled sections being round bars, wire rod, bars, etc. possibly upstream of the cooling plate.

The shearing assembly according to the invention is employed to shear for scrap the leading and trailing end segments of rolled sections leaving the last rolling mill stand and also to shear those rolled sections to size.

The shearing assembly is suitable to shear rolled sections at speeds up to 40 mts/sec. and with equivalent diameters up to 20 mm.+20 mm. in the simultaneous shearing of two rolled sections.

2. Background Discussion

The state of the art covers rolling plants having at their outlet two parallel rolled sections the leading and trailing ends of which include faults such as geometric deformations, a lack of cooling or unacceptable inclusions; these faults have to be eliminated.

The rolled sections often have also to be sheared to size for further processes or for subsequent cooling on the cooling plate positioned downstream.

The plants of the state of the art include a shearing assembly comprising two shears for shearing to size and a scrap shears which, due to its conformation (see DE-A-1427225) has considerable maintenance problems, setting problems, and requires intervention when there is a blockage of material.

Moreover, the resulting arrangement in these plants of the state of the art entails problems of occupation of spaces which are more and more valuable in view of the overall bulk of the plant; this arrangement also causes problems of access, and difficulties in carrying out quick day to day maintenance.

Moreover, in the plants of the state of the art the discards resulting from the scrap-shearing of the leading and trailing end segments generated by scrap shears are collected in two separate zones, each of which is on the axis of its own rolling line, with resulting problems for collection and subsequent removal of the discards.

SUMMARY OF THE INVENTION

The present applicants have designed, tested and embodied this invention to overcome the shortcomings of the state of the art and to achieve further advantages.

This invention is set forth and characterized in the main claim, while the dependent claims describe variants of the idea of the main embodiment.

The purpose of this invention is to provide a shearing assembly which is associated downstream of a rolling plant and which delivers at its outlet two parallel rolled sections, the shearing assembly having a small overall bulk and a lower consumption of energy than those of the state of the art and being financially advantageous as regards maintenance and the management of spare parts.

The shearing assembly according to the invention comprises two shears for shearing to size, each of which is associated with its own respective feeding assembly, these shears being positioned parallel with a distance between centres equal to the distance between centres of the two advancing rolled sections and being offset from each other in the longitudinal direction.

The shearing assembly according to the invention comprises one single scrap shears with two pairs of shearing elements, each of which pairs being arranged on one side of the shears and with the shearing elements arranged in coordination with the lines feeding the rolled sections.

According to a variant the scrap shears can be employed to shear one single rolled section; in this case the shearing elements present on the inoperative side of the scrap shears will be protected for safety reasons.

In this case, the scrap shears will include on the other side an advantageously removable element to cover and protect the rotary shafts.

According to the invention, the feeding units, the shears for shearing to size and the scrap shears have their relative motors all arranged on the same side, which facilitates maintenance operations on the shearing assembly and intervention in the case of blockages of the material.

According to a first embodiment the scrap shears has the blades shearing one rolled section in time with the blades shearing the other rolled section, but with the blades shearing one rolled section advantageously offset by 45° or by 90° in relation to the blades shearing the other rolled section so as to reduce the installed power inasmuch as the scrap-shearing of the two rolled sections does not take place at the same time.

According to the invention the scrap shears is associated with one single motor, which can be installed below the lower blade-holder element or else can be on the same axis as one of the two blade-holder elements.

The shearing assembly downstream of the scrap shears comprises means for the reception and discharge of discards, these means being able to discharge simultaneously the discards coming from the scrap-shearing of the leading and trailing end segments of the two rolled sections delivered to the scrap shears; these discards are discharged and collected in one single collection means positioned below.

The invention also makes possible the reduction of the longitudinal distance between the two shears and also the distance between centres of the rolled sections, thus reducing the overall bulk of the shearing assembly.

Moreover, with the shearing assembly according to the invention, maintenance operations are simplified, as are setting operations and resetting after any blockages.

By means of the invention the rolled sections sheared in the two lines have the same braking and deceleration spaces and maintain substantially the same position of outlet onto the cooling plate positioned downstream as compared to rolling lines which comprise shearing assemblies of the state of the art.

Moreover, the invention makes possible a reduction of the minimum length of the rolled section which can be discharged onto the cooling plate.

The shearing assembly according to the invention comprises a first lateral switch at the inlet of each shears shearing to size, so as to direct, when necessary, the rolled section into the channel leading to the scrap-shearing or into the channel leading to the cooling plate or to subsequent processings.

The shearing assembly also includes two second lateral switches positioned downstream of the scrap shears so as to feed alternately the double channel included downstream, so that at least two plus two lines feeding the rolled section passing through are available at the outlet of the shearing assembly.

BRIEF DESCRIPTION OF THE DRAWINGS

The attached figures are given as a non-restrictive example and show some preferred embodiments of the invention as follows:

FIG. 4b shows a variant of the scrap shears of FIG. 4a;

DETAILED DESCRIPTION OF THE PREFERRED EMBODIMENTS

Figure 1:
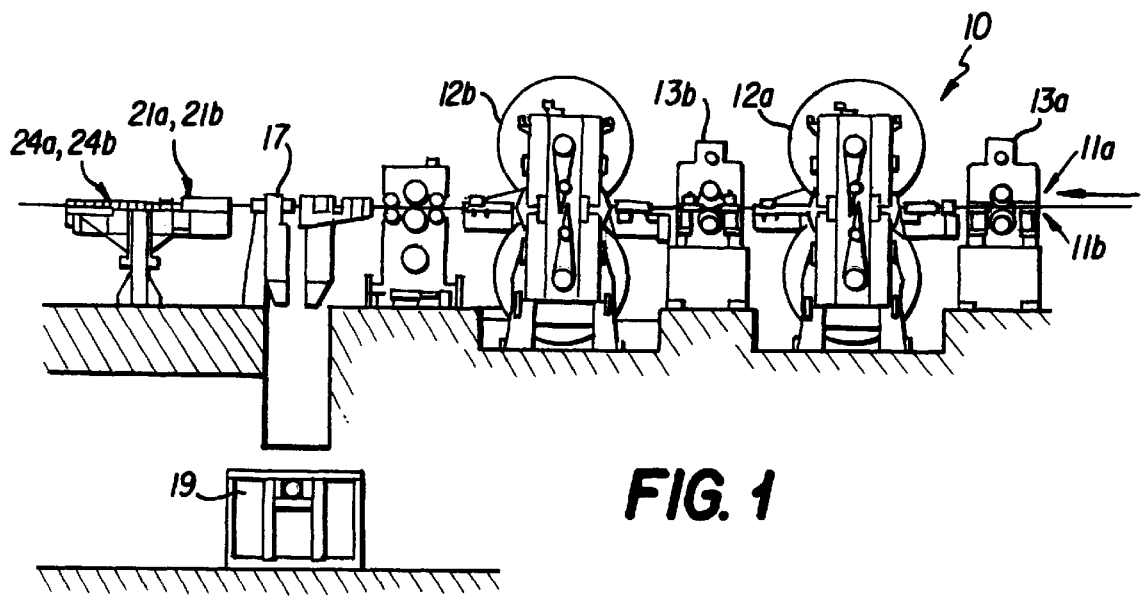
FIG. 1 is a partly cutaway side view of the shearing assembly according to the invention.
Figure 7:
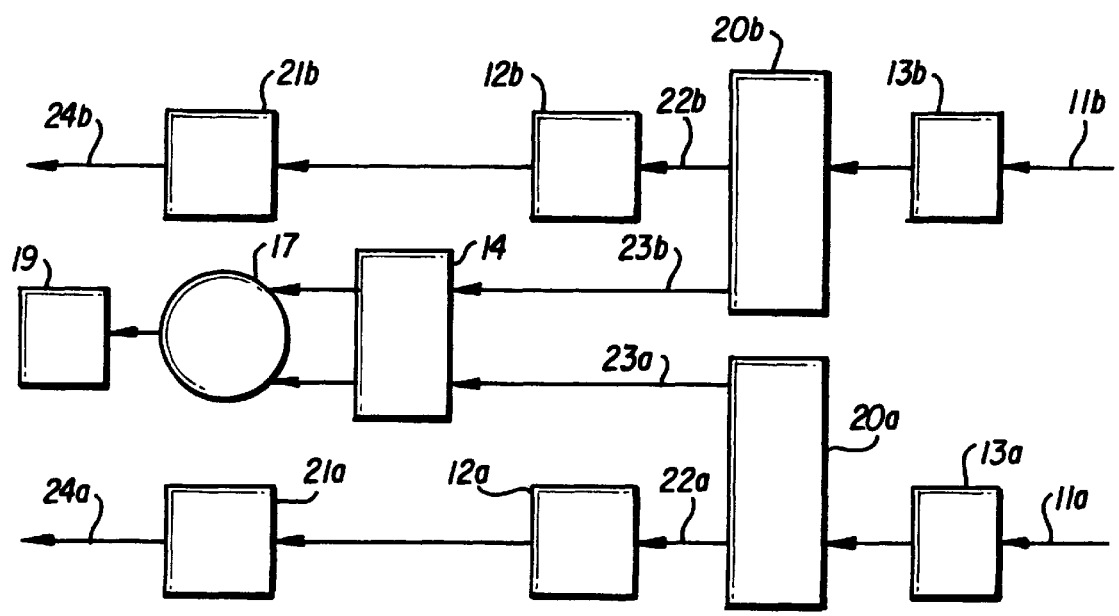
FIG. 7 shows a schematic diagram of the apparatus of FIG. 1.
Figure 2:
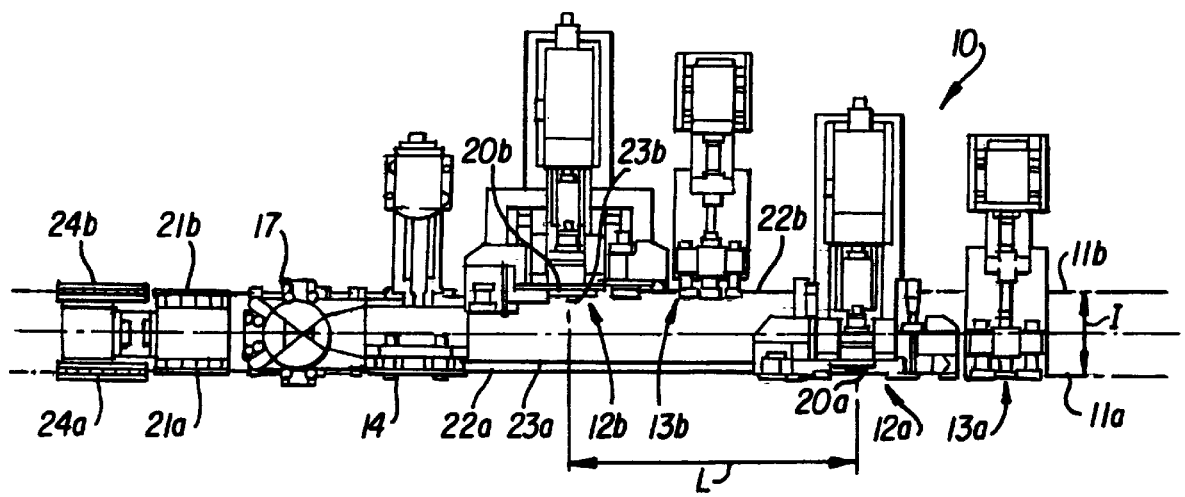
FIG. 2 is a plan view of the shearing assembly of FIG. 1.

The reference number 10 in the figures denotes generally a shearing assembly associated with two rolling lines whence there emerge two parallel rolled sections 11a, 11b.

The shearing assembly 10 according to the invention comprises for each rolled section 11a, 11b a shears 12a, 12b for shearing to size and a feeding unit 13a, 13b positioned in series and offset laterally from each other by a distance between centres equal to the distance between centres of the two rolled sections 11a, 11b being fed.

In the shearing assembly 10 according to the invention the longitudinal distance "L" between the two shears 12a, 12b performing shearing to size is about 2500 to 3500 mm., whereas the distance between centres "I" of the two rolled sections 11a, 11b is about 600 to 900 mm, advantageously between 700 and 800 mm.

The shearing assembly 10 comprises a scrap shears 14, which is installed downstream of the more downstream shears 12b performing shearing to size and is located in an intermediate position between the two rolled sections 11a, 11b.

The scrap shears 14 includes a blade-holder body 28 the two sides 29a, 29b of which each have two pairs of contrarotating blade-holder elements 15a, 15b respectively, which are arranged on both sides so as to cause the first rolled section 11a to cooperate, when so required, with the blade-holder elements 15a and the second rolled section 11b to cooperate, when so required, with the blade-holder elements 15b.

The distance between centres of the blade-holder elements 15a positioned on one side and the blade-holder elements 15b positioned on the opposite side of the scrap shears 14 is slightly less than the distance between centres "I" existing between the two rolled sections 11a, 11b so as to prevent contact between the same.

Figure 5A:
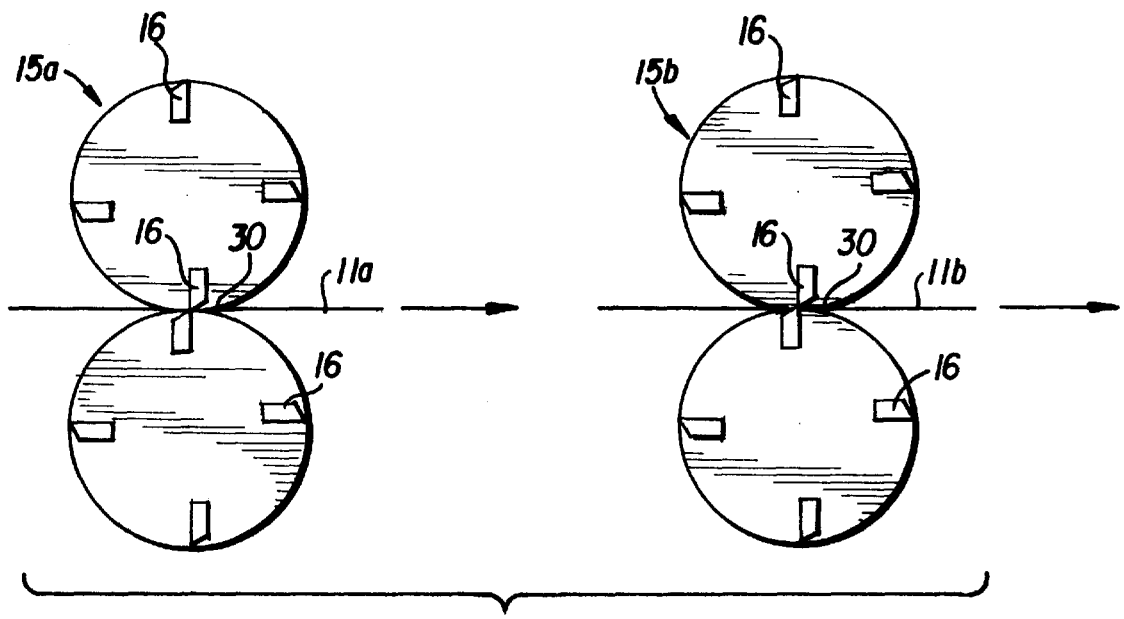
FIG. 5a shows a first form of embodiment of the blade-holder elements of the scrap shears of FIG. 3.

According to one first form of embodiment the scrap shears 14 has first and second blade-holder elements 15a, 15b with their blades 16 shearing at the same time, thus entailing simultaneous shearing of the two rolled sections 11a, 11b (see FIG. 5a). The sheared rolled sections 11a, 11b discharge from respective outlets 30 of elements 15a, 15b.

Figure 5B:
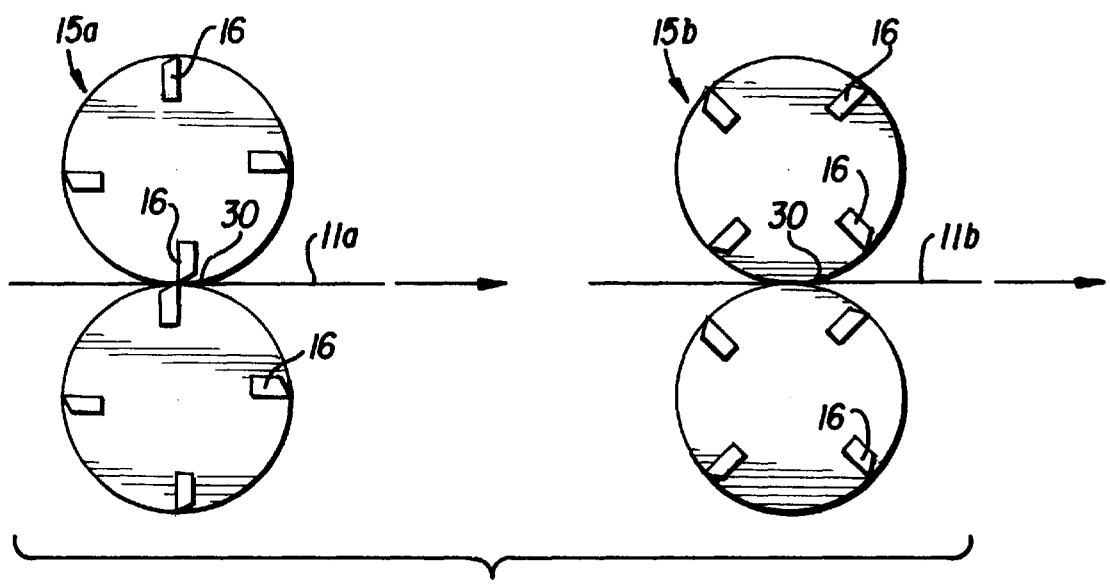
FIG. 5b shows a second form of embodiment of the blade-holder elements of the scrap shears of FIG. 3.

According to another embodiment of the invention the blades 16 of the first blade-holder elements 15a are offset at an angle to the blades 16 of the second blade-holder elements 15b, thus entailing alternate shearing of the two rolled sections 11a, 11b (see FIG. 5b). The sheared rolled sections 11a, 11b discharge from respective outlets 30 of elements 15a, 15b.

Figure 3:
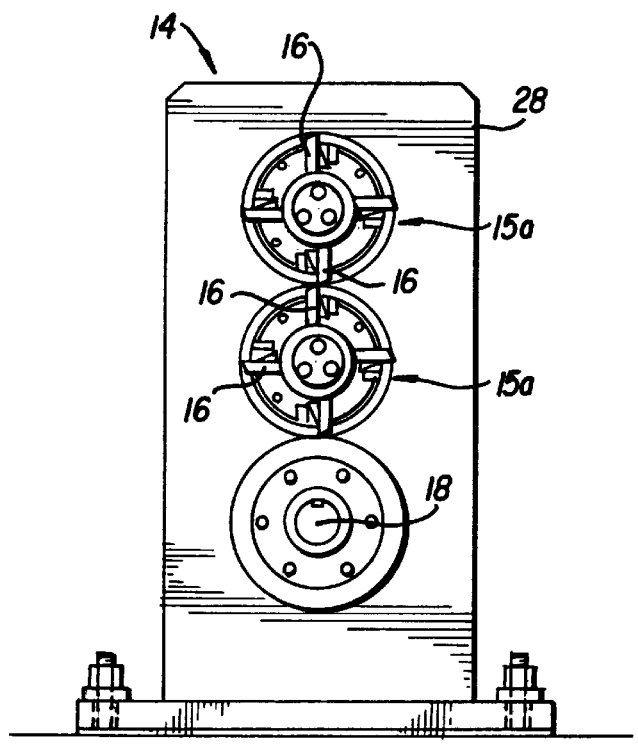
FIG. 3 shows in an enlarged scale a side view of the scrap shears of the shearing assembly of FIG. 1.
Figure 4B:
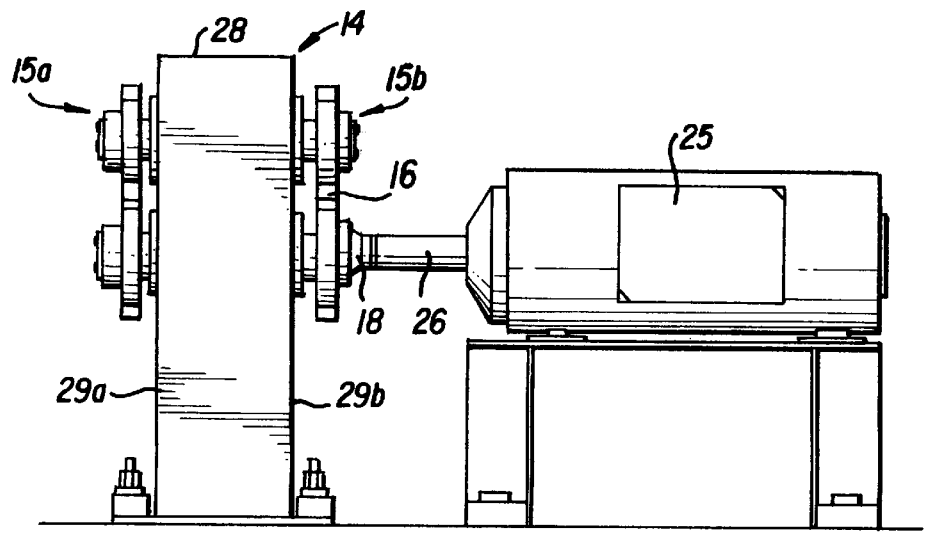
Figure 4A:
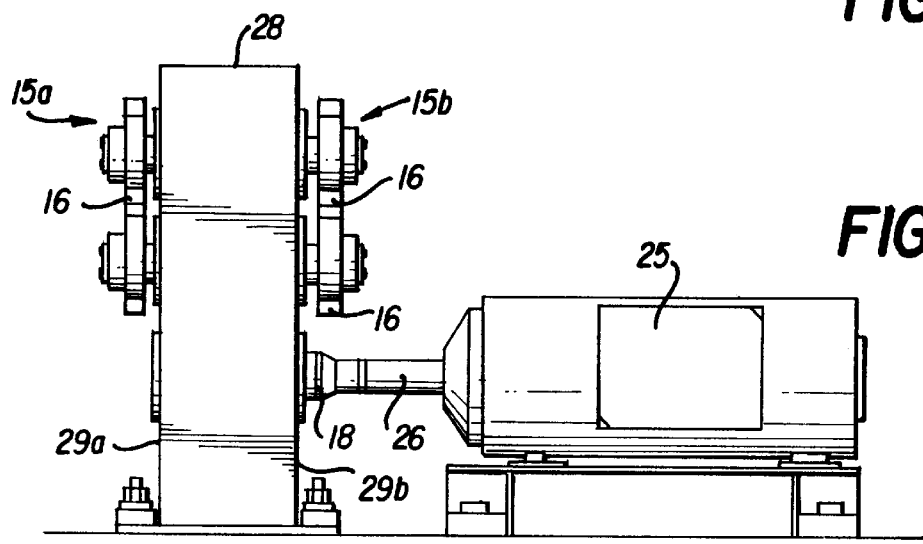
FIG. 4a shows a front view of the scrap shears of FIG. 3.

In the forms of embodiment shown in FIGS. 3 and 4a a drive pinion 18 of the scrap shears 14 in association with a motor 25 is positioned lower than the lower blade-holder element of each pair of first and second blade-holder elements 15a, 15b.

In the form of embodiment shown in FIG. 4b, the drive pinion 18 is on the same axis as one of the rotary shafts with which are associated the blade-holder elements 15, in this case the lower shaft.

In this case the motor 25 is associated with its respective drive pinion 18 by means of an adapter joint 26, which enables the motor 25 to be separated by the required distance from the relative scrap shears 14.

Figure 6:
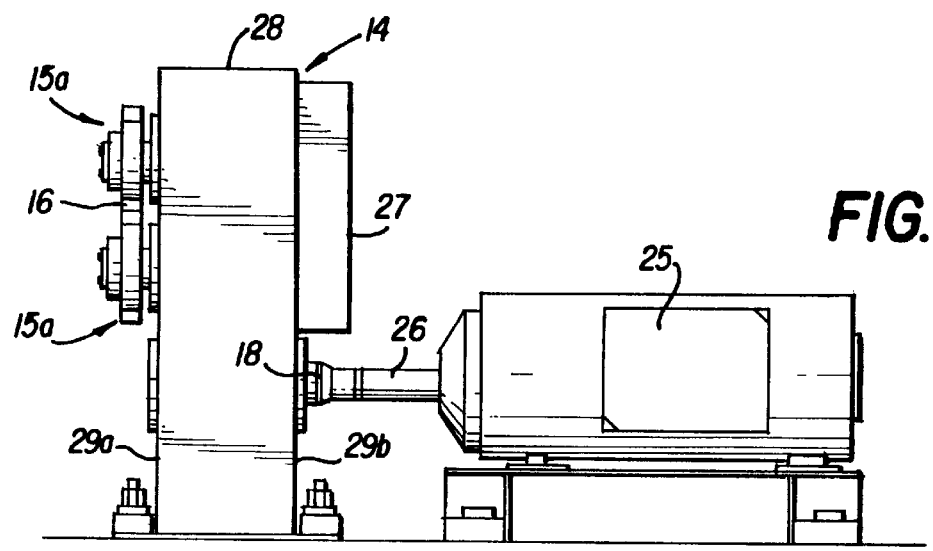
FIG. 6 shows the scrap shears of FIG. 4a as employed in the shearing of one single rolled section.

FIG. 6 shows a scrap shears 14 employed to shear one single rolled section.

In this case, the blade-holder elements 15a are associated with the rotary shafts only on the side on which the rolled section 11 passes, whereas on the other side the scrap shears 14 includes a covering and protective element 27 of a removable type which covers the end part of the rotary shafts.

In a successive step the covering and protective element 27 can be removed and replaced by two blade-holder elements 15b to enable two rolled sections 11a, 11b to be sheared at the same time.

The shearing assembly 10 according to the invention includes two first lateral switches 20a, 20b, each of which cooperates with the intake of the corresponding shears 12a, 12b for shearing to size so as to switch the rolled sections 11a, 11b alternately into the rolling channels 22a, 22b or into scrap-conveying channels 23a, 23b associated with the scrap shears 14.

The shearing assembly 10 comprises, downstream of the scrap shears 14, second switches 21a, 21b cooperating with the respective rolled sections 11a, 11b so as to feed alternately one double removal channel 24a, 24b installed downstream.

The shearing assembly 10 according to the invention provides, downstream of the scrap shears 14, a cyclone 17 for the discharge of discards, this cyclone 17 being able to discharge the discards arriving from the two rolled sections 11a, 11b at the same time.

These discards are discharged and collected in one single container 19 positioned below the discharge cyclone 17.

What is claimed is:

1. An assembly to shear first and second rolled sections (11a, 11b) coming from respective first and second parallel, adjacent rolling lines, the assembly comprising a single scrap shears (14) having at least one pair of blade-holder elements (15a or 15b), a discharging element (17) for discharge of discards downstream of the scrap shears (14), and said first and second parallel adjacent rolling lines, respectively each rolling line comprising a feeding unit (13a, 13b), shears (12a, 12b) for shearing to longitudinal size the respective rolled section, a rolling channel (22a, 22b) communicating with the shears (12a, 12b) for shearing-to size, a scrap-conveying channel (23a, 23b) for feeding the respective rolled section to the scrap shears, wherein each shears (12a, 12b, 14) and feeding unit (13a, 13b) has a respective motor and every said motor is arranged on a same side of the assembly.

2. The shearing assembly as in claim 1, wherein the scrap shears (14) has a first pair of blade holder elements and a second pair of blade-holder elements (15), each blade holder element having four blades (16), the first pair of blade-holder elements (15a) carrying the blades (16) at the same time as the blades (16) associated with the second pair of blade-holder elements (15b) but angularly offset in relation to the blades (16) associated with the second pair of blade-holder elements (15b).

3. The shearing assembly as in claim 1, wherein the scrap shears (14) has two pairs of blade-holder elements (15a, 15b) and rotary shafts wherein at least one of the blade-holder elements (15a, 15b) is mounted on each of the rotary shafts, and wherein the scrap shears (14) has a blade-holder body (28), having a first side (29a) and a second side (29b) from which the blade-holder elements (15) have outlets respectively on the first side (29a) of the blade holder body and on the second side (29b) of the blade holder body, said scrap shears having a motor and an entrance for the motor (25) of the scrap shears being placed under the rotary shafts on which the blade-holder elements (15a, 15b) are mounted.

4. The shearing assembly as in claim 1, wherein the scrap shears (14) has two pairs of blade-holder elements (15a, 15b) and rotary shafts, wherein at least one of the blade-holder elements (15a, 15b) is mounted on each of the rotary shafts, and wherein the scrap shears (14) has a blade-holder body (28), having a first side (29a) and a second side (29b), from which the blade-holder elements (15) have outlets respectively on the first side (29a) of the blade holder body and the second side (29b) of the blade holder body, said scrap shears having a motor and an entrance for the motor (25) of the scrap shears being placed directly on a same axis as one of the rotary shafts on which the blade-holder elements (15a, 15b) are mounted.

5. The shearing assembly as in claim 1, wherein the scrap shears (14) has a blade holder body and rotary shafts and wherein each of said blade holder elements is mounted on a respective said shaft on a first side of the scrap shears, wherein the scrap shears (14) includes a covering and protective element (27) of a removable type to cover ends, of the rotary shafts, associated with a second side of the scrap shears opposite to the first side of the scrap shears where said blade-hold elements (15a) are mounted.

6. The shearing assembly as in claim 1, wherein a distance "I" between the centers of the rolled sections (11a, 11b) upstream of the respective first switch is between 600 and 900 mm.

7. The shearing assembly as in claim 1, wherein a distance "I" between the centers of the rolled sections (11a, 11b) upstream of the respective first switch is between 700 and 800 mm.

8. The shearing assembly as in claim 1, wherein a longitudinal distance "L" between the two shears (12a, 12b) for shearing to size is between 2500 and 3500 mm.

9. The shearing assembly as in claim 1, wherein a longitudinal distance "L" between the two shears for shearing to size (12a, 12b) is about 3000 mm.

10. The shearing assembly as in claim 2, wherein the scrap shears (14) have rotary shafts and at least one of the blade-holder elements (15a, 15b) is mounted on each of the rotary shafts, the scrap shears (14) has a blade-holder body (28), having a first side (29a) and a second side (29b), from which the blade-holder elements (15) have outlets respectively on the first side (29a) of the blade holder body and on the second side (29b) of the blade holder body, said scrap shears having a motor and an entrance for the motor (25) of the scrap shears being placed under the rotary shafts on which the blade-holder elements (15a, 15b) are mounted.

11. The shearing assembly as in claim 2, wherein the scrap shears (14) have rotary shafts and at least one of the blade-holder elements (15a, 15b) is mounted on each of the rotary shafts the scrap shears (14) has a blade-holder body (28), having a first side (29a) and a second side (29b), from which the blade-holder elements (15) have outlets respectively on the first side (29a) of the blade holder body and the second side (29b) of the blade holder body, said scrap shears having a motor and an entrance for the motor (25) of the scrap shears being placed directly on a same axis as one of the rotary shafts on which the blade-holder elements (15a, 15b) are mounted.

12. The shearing assembly as in claim 2, in which a distance "I" between the centers of the rolled products (11a, 11b) upstream of the respective first switch is between 600 and 900 mm.

13. The shearing assembly as in claim 2, in which a distance "I" between the centers of the rolled products (11a, 11b) upstream of the respective first switch is between 700 and 800 mm.

14. The shearing assembly as in claim 2, wherein a longitudinal distance "L" between the two shears (12a, 12b) for shearing to size is between 2500 and 3500 mm.

15. The shearing assembly as in claim 2, wherein a longitudinal distance "L" between the two shears for shearing to size (12a, 12b) is about 3000 mm.

16. The sbearing assembly as in claim 1, further comprising a first switch (20a, 20b) to guide the respective rolled section (11a, 11b) alternately towards the rolling channel (22a, 22b) and towards the scrap-conveying channel (23a, 23b).

17. The shearing assembly as in claim 1, further comprising a first switch (20a, 20b) to guide the respective rolled section (11a, 11b) alternately towards the shears for cutting to size and towards the scrap shears.

18. The shearing assembly as in claim 1, further comprising a second switch (21a, 21b), downstream from the scrap shears (14), to feed the rolled sections (11a, 11b) from the respective shears for shearing to size (12a, 12b) to a removal channel (24a, 24b) arranged downstream of the respective second switch (21a, 21b).

* * * * *